United States Patent [19]

Engelsmann et al.

[11] 4,265,527
[45] May 5, 1981

[54] FLASH UNIT AND CAMERA

[75] Inventors: Dieter Engelsmann, Unterhaching; Karl Wagner, Munich; Hubert Hackenberg, Holzkirchen, all of Fed. Rep. of Germany

[73] Assignee: Agfa-Gevaert AG, Leverkusen, Fed. Rep. of Germany

[21] Appl. No.: 150,994

[22] Filed: May 19, 1980

[30] Foreign Application Priority Data

May 22, 1979 [DE] Fed. Rep. of Germany ....... 2920751

[51] Int. Cl.³ ............................................. G03B 15/03
[52] U.S. Cl. .................................................. 354/144
[58] Field of Search ....................... 354/143, 144, 148

[56] References Cited

FOREIGN PATENT DOCUMENTS 2058385 11/1970 Fed. Rep. of Germany ........... 354/148

Primary Examiner—Donald A. Griffin
Attorney, Agent, or Firm—Michael J. Striker

[57] ABSTRACT

A multi-lamp flash unit and a camera with which it is usable, are described. The flash unit has a mounting shoe with which it is connectable to the camera. The shoe has an opening affording access to the interior of the unit, where a triggering element can be displaced from a rest position to an operating position in which it triggers advancement of a flash lamp into a reflector of the unit. The camera has an element which can enter through the opening and displace the triggering element to the operating position of the same.

12 Claims, 4 Drawing Figures

FLASH UNIT AND CAMERA

BACKGROUND OF THE INVENTION

This invention relates to a multiple-lamp flash unit and to a camera usable with the same.

More particularly, the invention relates to a multiple-bulb flash unit having a drive which, when actuated, moves the lamps seriatim to firing position, and a camera having an arrangement for actuating the drive.

Multiple-lamp flash units in which the lamps are sequentially moved into firing position, are already known from German Pat. No. 848,012, as well as from German published applications OS Nos. 2,118,418 and 1,522,916. These flash units incorporate a spring motor which is released for stepwise dissipation of its stored energy when an electromagnet is energized upon firing of a bulb, so that the motor moves a fresh bulb into firing position. These prior-art devices perform their intended function, but since they require an electromagnet and associated circuitry they are also rather expensive to manufacture.

A more economical proposal is known from German published application OS No. 1,497,381 where the dissipation of stored spring energy, in a sense causing stepwise advancement of the multiple lamps into firing position, is manually initiated after each flash. In this arrangement the user may, however, forget to cause a new flash lamp to be moved to firing position, with the result that he may find himself in sudden need of a flash but with no flash lamp in position for firing.

SUMMARY OF THE INVENTION

It is an object of the invention to overcome drawbacks of the prior art.

A more particular object is to provide a multiple-lamp flash unit which permits the automatic sequential advance of a fresh flash lamp to firing position in response to firing of the previous lamp, but without requiring electromagnetic means for this purpose.

Another object is to provide a camera for use with such a flash unit.

Still a further object is to provide an arrangement which prevents unintentional movement of flash lamps to the firing position as the flash unit is being connected to the camera.

In accordance with these and other objects which will become apparent hereafter, one aspect of the invention resides in a multiple-lamp flash unit. Briefly stated, such a unit may include a casing having a flashlamp firing station; transporting means for transporting a plurality of flashlamps seriatim to the firing station; means for advancing the transporting means, including a sprocket operatively connected with the transporting means and a pawl alternately disengageable from and re-engageable with the sprocket so that the latter can perform a stepwise advance of the transporting means during each disengagement of the pawl; and triggering means movable from a rest position to an operating position in which it disengages the pawl from the sprocket, the casing having an opening to afford access to the triggering means by an actuating element of a camera to which the flash unit is connectable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
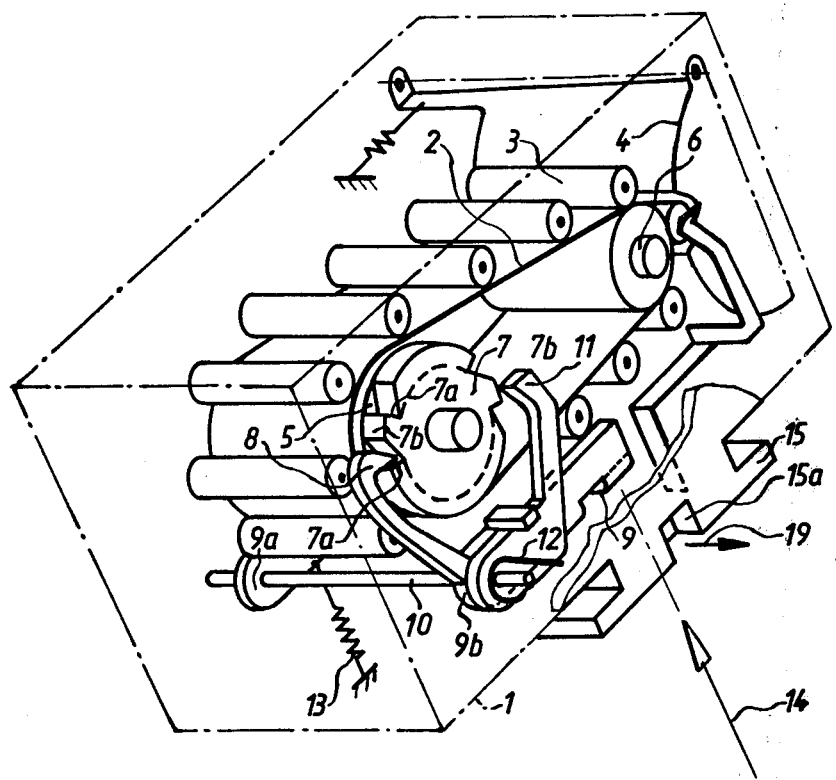
FIG. 1 is a perspective view, partly broken away, of a flash unit according to the invention.

In all Figures of the drawing, like elements are designated with the same reference numerals.

Figure 2:
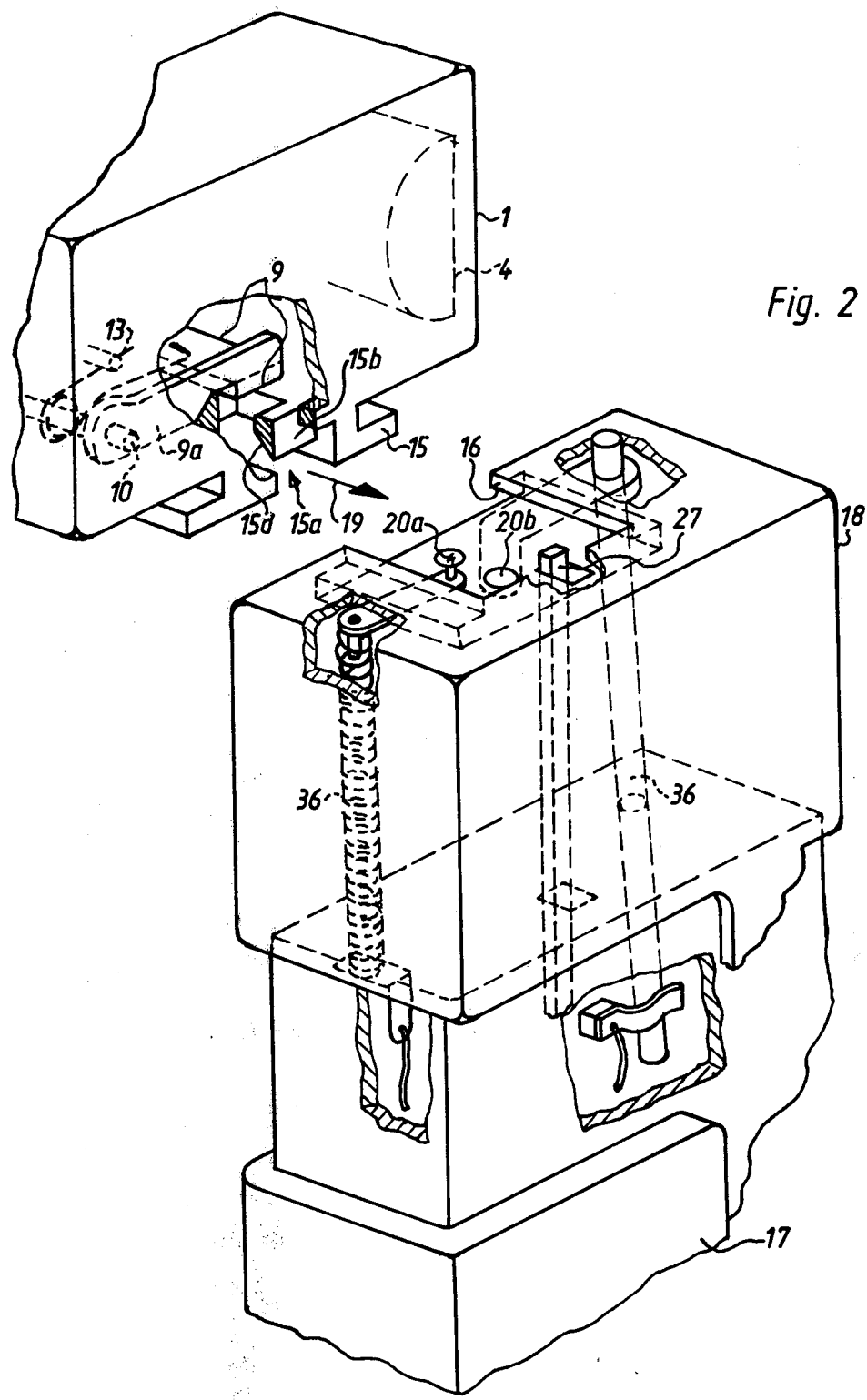
FIG. 2 is a perspective view, partly broken away, showing a detail of the flash unit in FIG. 1 and a part of a camera for use with the flash unit.
Figure 3:
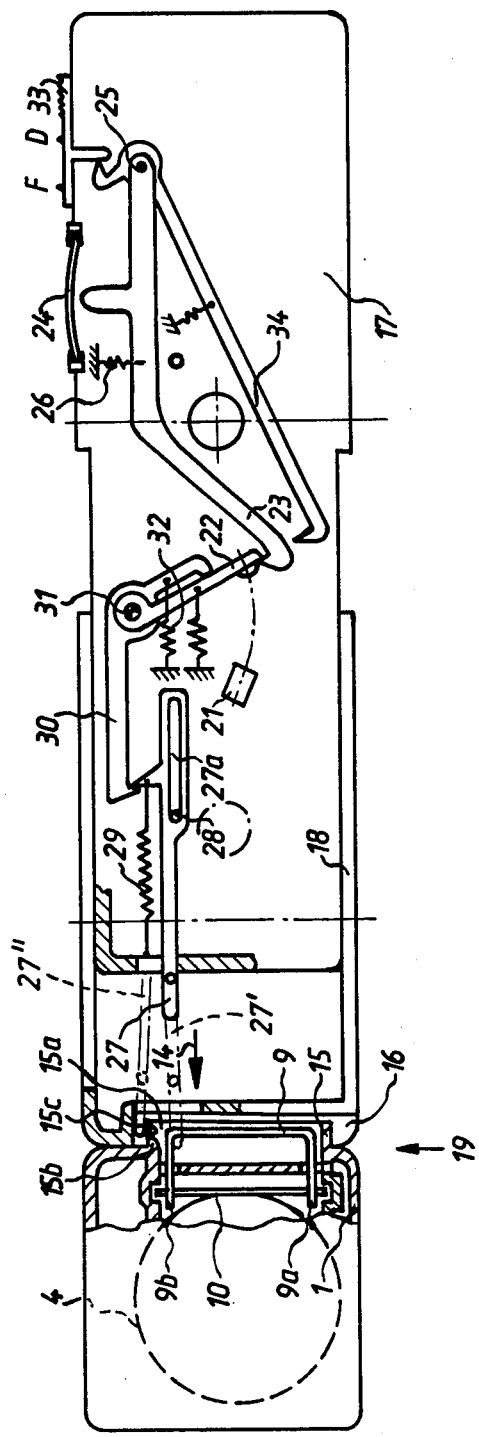
FIG. 3 is a top plan view, partly in section and with certain wall portions omitted to show interior mechanism, of the flash unit and camera of FIG. 2 in connected condition.

A first embodiment of the invention is shown in FIGS. 1-3 wherein reference numeral 1 identifies the casing of a multiple-lamp flash unit. The unit incorporates a plurality of flash lamps 3, preferably of the electrically ignitable type and preferably mounted on or in an endless belt 2. A reflector 4 is provided at the firing station of the unit and may have an opening or cut-out 4a at the apex of its curvature through which the flash lamps 3 enter or in which they become located in preparation for firing.

Also provided are two rollers 5, 6 about which the belt 2 is trained and by which it is tensioned. The roller 5 is connected to and driven by a known-per-se spring motor (not illustrated) in which sufficient energy is stored to move the several flash lamps 3 seriatim to the firing position. When the spring motor dissipates energy, it rotates the roller 5 which entrains and advances the belt 2. A mechanism for alternately permitting and interrupting this dissipation of energy includes a sprocket 7 having teeth 7a, 7b and being connected with the spring motor. A pawl 8 is provided which engages the respective teeth 7a to thereby block the sprocket 7 from rotating—and thus the spring motor from dissipating energy.

The pawl 8 is connected with a trigger element 9 which has two arms 9a, 9b and is turnably mounted on a shaft 10, together with the pawl 8. Also turnably mounted on that shaft is a blocking pawl 11 which preferably, but not necessarily, is a separate (discrete) member. When the pawl 8 is pivoted in anticlockwise direction it releases the sprocket 7 which can now turn in clockwise direction with the roller 5 as the spring motor dissipates stored energy. During this movement the pawl 11 slides over the back flank 7b of a respective tooth and drops in place ahead of the next tooth 7a, thus terminating rotation of the sprocket and roller. In other words: the roller 5 can each time only turn through an angular distance corresponding to the length of a tooth 7a.

A biasing spring 12 urges the pawl 11 towards the teeth of sprocket 7; pawl 11 is in engagement with pawl 8 and arm 9b of the element 9. A second, stronger spring 13 engages the pawl 8 or, as shown here, the trigger element 9 (e.g., arm 9a thereof) and permanently urges the pawl 8 towards engagement with the teeth of sprocket 7; such engagement takes place when, subsequent to disengagement of pawl 8 from sprocket 7 by operation of the member 9, the operating force acting upon member 9 is terminated again. As pawl 8 reengages the sprocket 7, the pawl 11 is moved away from the tooth 7a which it previously engaged but remains in contact with the next flank 7b. At this time, therefore, the sprocket 7, pawl 8 and pawl 11 are back in their relative positions which are illustrated in FIG. 1.

To be able to mount the flash unit 1 on a camera the unit 1 may have a conventional mounting foot 15 which can be slidably inserted (in the direction indicated by arrow 19) into a shoe or receiver 16 of a camera 17 (FIG. 2) or of a reciprocable film transporting and shutter-cocking slide 18 of the camera (used mainly on so-called "pocket" cameras). The underside of shoe 15 has electrical firing contacts for firing the flash lamps; these contacts and the associated circuitry are known per se and therefore not illustrated. The contacts on shoe 15 move into electrical connection with corresponding contacts 20a, 20b of the shoe 16, via which the firing signal coming from the camera is transmitted to the flash unit 1. The firing voltage for the flash lamps 1 may be supplied in the known manner via a synchronizing contact in dependence upon the operation of the not-illustrated camera shutter or, as shown, a piezoelectric crystal 21 may be provided (FIG. 3) which produces an electrical current when impacted, in this case by a spring-driven arm 22 which is stressed in known-per-se manner during film transportation and arrested in stressed condition by a latch 23 which is released when a camera release 24 is operated. The latch 23 is turnable about the axis 25 and permanently subject to spring bias from a restoring spring 26.

To assure that, even if the unit 1 is detached from the camera after a flash lamp has been fired but before the film in the camera is transported, a fresh lamp 3 is in ready position at the reflector 4, it is necessary for the trigger element 9 to be operated immediately after a flash lamp located at the reflector has been fired, or at the latest by the time the operation of the camera shutter is complete for that particular exposure. For this purpose the foot 15 is provided below the element 9 with an opening 15a to afford access to element 9 by whatever camera element (e.g., the lever 27) is provided to operate the element 9. The lever 27 (or analogous element) must be so arranged that it moves against the element 9 normal thereto, either in the event of piezoelectric firing or of firing via a battery-capacitor circuit (i.e., via a synchronizing contact); on engaging the element 9 it must move the same in counterclockwise direction (FIG. 1) so that member 9 causes the pawl 8 to become disengaged as described earlier, thus causing the transportation of the next flash lamp to the reflector 4.

The lever 27 has a longitudinal slot into which a stationary pin 28 extends; it can slide lengthwise due to this slot-and-pin connection and can also pivot about the pin 28. A spring 29 permanently tends to bias the lever 27 towards the camera opening through which the opening 15c and the member 9 are accessible. A lever 30 is provided which pivots about the pivot axis 31 of the impact arm 22 and is urged into contact with arm 22 by a spring 32. A release of arm 22 for firing a lamp 3 thus automatically causes lever 30 to be pivoted in clockwise direction about pivot 31, so that it disengages lever 27 which then under the action of spring 29 strikes and moves the element 9. When the film is subsequently transported the lever 27 and arm 30 are returned to their illustrated positions (FIG. 3); how this can be done is known per se and requires no explanation.

For one reason or another a user may have the flash unit 1 installed in his camera even when he does not intend to make flash exposures, i.e., when daylight exposures are to be made. The arrangement described above does not, of course, sense light conditions so that flash lamps 3 would be fired even when there is no need for flash exposures. To avoid this the camera is advantageously provided with a selector 33 which can be moved between a position D (for daylight) and a position F (for flash), as shown in FIG. 3. When it is moved to the position D, a projection of selector 33 disengages a spring-biased lever 34 and allows it to pivot about axis 25 under the spring bias, so as to move into the path of movement of arm 22, thus preventing that arm from so moving. Conversely, when moved to position F the selector 33 engages lever 34 and moves it out of the path of arm 22, counter to its spring bias.

A consideration of FIGS. 1–3 will show that it is possible for a user to connect the flash unit 1 to the camera 17 at any time. Should this be done after an exposure has just been made with the camera but before the film is transported, then the lever 27 will be in the position 27' shown in FIG. 3. If, however, the lever 27 is in the position 27' when the unit 1 is attached to the camera, lever 27 will operate the trigger element 9 and thereby cause a new lamp 3 to be transported to firing position, despite the fact that the lamp previously located in that position had not yet been fired. To prevent this the unit 1 is provided with a cam 15b which projects into the opening 15a and is so arranged as to encounter the lever 27 if the same is in position 27' when unit 1 is being attached to camera 17; during the course of attaching the unit 1 to camera 17 in the direction of arrow 19 the cam 15b deflects lever 27 from the position 27' to the position 27''. During the next film transport the lever is then retracted from the position 27'' to the illustrated full line position. In other words: should the lever 27 be in a position—at the time the unit 1 is connected to the camera 17—to cause unintended transportation of a flash lamp to the firing position, the cam 15b will move the lever out of this position and prevent the lamp transport.

The cam 15b has a rear side—i.e., facing counter to the direction of arrow 19—which is inclined in direction inwardly of the casing of unit 1. The purpose of this is to prevent damage to the lever 27 in the event the unit 1 is detached from the camera 17 immediately after firing of a flash lamp but before film transport takes place. As indicated above the lever 27 will, in this event, assume the position 27' in which it extends into the interior of the unit 1 and could be damaged by removal of the same from the camera 17, but for the fact that the inclined side will push it out of the unit 1 in such event.

In some circumstances, e.g., due to impact or vibrations, it might happen that the trigger member 9 is accidentally moved to the position in which it releases the flash lamps 3 for transportation while the unit 1 is not attached to a camera; i.e., in which a new flash lamp is transported to the firing position. This can be avoided by providing a blocking arrangement as shown in FIG. 4.

The arrangement comprises an angled leaf spring 35 which is riveted, clamped or otherwise securely held (see FIG. 4) at one portion thereof. The angled arm 35a of spring 35 extends out (not shown) from the foot 15; in this position it abuts the member 9 and prevents unintended movement of the same in the direction of arrow 14. The free end of arm 35a has one or more inclined faces so that it can be pushed inwardly of the unit 1 as the foot 15 is inserted into the shoe 16. Such inward deflection not only moves arm 35a out of the way, but also causes spring 35 to disengage the member 9, thereby permitting member 9 to be operated when the unit 1 is installed on a camera.

Figure 4:
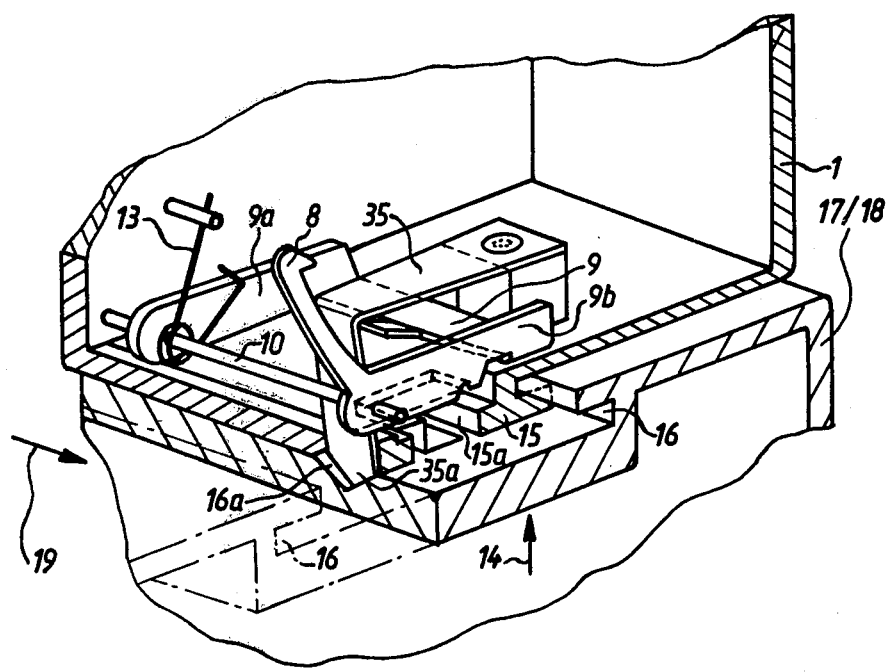
FIG. 4 is a view analogous to FIG. 2 but showing a different embodiment.

FIG. 4 shows that the spring 35 may actually assume three positions, rather than merely the two described above, namely, one position in which it projects from the foot 15 and locks the member 9, one in which it is completely deflected into the unit 1 to permit installation and removal of the unit 1 on a camera, and an intermediate position (shown in FIG. 4) in which it releases the member 9 so that the same can be actuated but projects sufficiently to engage in groove 16c and latch the unit 1 on the camera against unintended displacement relative thereto.

The invention is susceptible of a variety of changes and modifications which are all considered to be within the scope of the appended claims. For example, the shoe 16 need not be on a slide 18 which is reciprocable relative to the actual camera housing and wherein the electrical connection to the current source 21 is effected via the guides 36 for the slide 18, analogously to the manner shown in FIG. 2; the shoe 16 could be fixedly mounted on the actual camera housing itself.

The slidable and pivotable lever 27 could be replaced by an element which is movable only in one direction, for example on a slide which is movable against the member 9 and which can be pushed back into the camera housing via an inclined face 15d, to be arrested in the camera housing in a not-illustrated known manner. One possibility would be for the lever 30 to be movable back to its blocking position under spring bias when the release 24 is tripped. The lever 27 could also be constructed as a pivotable member which during its pivoting movement impinges and displaces the member 9 and thereupon can continue to turn out of the range of member 9, being pivotable out of this range by the cam 16b. Another possibility would be to make the member 27 an element which is either a slide or a lever movable to a position in which it is located in the path of movement of cam 15b (during movement of unit 1 in the direction of arrow 19) so as to prevent connection of the unit 1 to a camera and alert the user to the need for effecting film transportation before the connection can be made.

In lieu of the foot 15 and shoe 16 the connection between unit 1 and camera 17 could be made by a bayonet-type coupling; for this, the member 9, cam 15a, 15b and element 27 would need to be located eccentrically to the turning axis of the bayonet coupling and all in the same radius. More than one coupling, or more than one set of cooperating foot and shoe, could be provided, one on each of two or more different faces of the unit 1 and camera 17.

Other means which are functionally equivalent to those described above, could also be used. For example, pivotable pawls 8, 11 could be replaced with slidable members which could, e.g., be arranged diametrically relative to the sprocket 7 and be shiftable along a diameter thereof. The prestressed member 27 could be replaced with an element corresponding to member 22 and serving to hurl the member 27 to the position in which it operates member 9. The spring 35 could cooperate with pawl 8 rather than with member 9, for example via an abutment on spring 35 and a notch on pawl 8.

Member 9 need not be of one piece with pawl 8; an abutment of pawl 8 could engage the member 9 in motion-transmitting relationship. Member 9 need not be elongated, but could be in form of an, e.g., square or circular plate.

Also, the flash lamps 3 need not be mounted on a belt 2; they could be mounted in an appropriate guide track and advanced to and from the reflector 4 (as described above) via a movable gripper powered by the spring motor and sprocket 7. If the space at and adjacent the apex of curvature of the reflector 4 is so small that it is not practicable to provide the apex with a cut-out and move the lamps 3 into this cut-out, then the reflector 4 could be mounted for movement in its axial (i.e., lengthwise) direction, in such a manner that during each lamp advancement it automatically moves out of the way of the spent and the new lamp, and thereafter moves back to firing position about the new lamp.

The selector 33 and its associated components could be replaced, and lamp transportation during daylight exposures be blocked, by providing a known per se arrangement (e.g., feeler or sensor) in or on shoe 16 which detects the presence or absence of the foot 15 and moves the lever 34 to the appropriate position. The exposure time for flash exposures can be made either by means of the selector 33 in accordance with the position thereof, or by a feeler or sensor of the camera which detects the presence of the unit 1.

While the invention has been illustrated and described as embodied in a still camera of the miniature type, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a multiple-lamp flash unit, a combination comprising a casing having a flashlamp firing station; transporting means for transporting a plurality of flash-lamps seriatim to said firing station; means for advancing said transporting means, including a sprocket operatively connected with said transporting means and a pawl alternately disengageable from and re-engageable with said sprocket so that the latter can perform a stepwise advance of said transporting means during each disengagement of the pawl; and triggering means movable from a rest position to an operating position in which it disengages said pawl from said sprocket, said casing having an opening to afford access to said triggering means by an actuating element of a camera to which said flash unit is connectable.

2. A combination as defined in claim 1, said advancing means comprising a spring motor having a rotary output member to which said sprocket is coupled in motion-receiving relationship.

3. A combination as defined in claim 1, further comprising an additional pawl movable in response to movement of the first-mentioned pawl to arrest said sprocket on completion of each stepwise advance thereof.

4. A combination as defined in claim 1, and further comprising a reflector located at said firing station for reflecting the flash produced by the respective flash lamps.

5. A combination as defined in claim 1, said casing including a mounting element projecting from said casing in a first direction for connecting said casing to a camera; and wherein said triggering means is movable from said rest position to said operating position in a second direction which includes an angle with said first direction.

6. A combination as defined in claim 5, further comprising a cam projecting into said opening transversely of a third direction in which said casing is connectable to a camera, said cam being positioned to intercept and render inoperative the actuating element of the camera in the event the actuating element is in a position to operate said triggering means as the casing is being connected to the camera.

7. A combination as defined in claim 6, said opening being elongated in said second direction as well as in said third direction.

8. A combination as defined in claim 6, said cam having a side facing counter to said third direction and inwardly of said casing, and said side having a surface inclined inwardly of said casing.

9. In combination with the flash lamp unit defined in claim 1, a camera comprising a housing; and an actuating element movable relative to said housing in a path in which it engages said triggering means and displaces it from said rest position to said operating position.

10. A combination as defined in claim 9, said triggering means being movable from said rest position to said operating position in one direction, and said casing being connectable with said camera in another direction; and wherein said actuating element is a lever shiftable in said one direction and tiltable in said other direction.

11. A combination as defined in claim 9, further comprising a spring operatively connected to said actuating element and adapted to store energy when a shutter of the camera is cocked, the actuating element being releasable for movement toward said triggering means under simultaneous dissipation of the energy stored in said spring, when a flash-operating element of the camera is actuated.

12. A combination as defined in claim 9, wherein said casing of said flash lamp unit includes a mounting shoe provided with said opening, and said housing of the camera has a socket in which said shoe is receivable and which is provided with a hole through which said actuating element has access to said opening and hence to said triggering means.

* * * * *